Dec. 22, 1936.   W. ZEH ET AL   2,065,411

SENSITIZING OF PHOTOGRAPHIC EMULSIONS

Filed July 28, 1932

Bis-[3-ethyl-benzthiazole-(2)]-α.γ-dimethyl-
-trimethine-cyanine iodide

Bis-[3-ethyl-benzthiazole-(2)]-tri-
methine-cyanine iodide

Inventors:
Walter Zeh,
Wilhelm Schneider,
By Attorney
Philip S. Hopkins.

Patented Dec. 22, 1936

2,065,411

UNITED STATES PATENT OFFICE 2,065,411

SENSITIZING OF PHOTOGRAPHIC EMULSIONS

Walter Zeh and Wilhelm Schneider, Dessau in Anhalt, Germany, assignors to Agfa Ansco Corporation, Binghamton, N. Y., a corporation of New York Application July 28, 1932, Serial No. 625,480
In Germany July 28, 1931

8 Claims. (Cl. 95—7)

Our present invention relates to sensitizing of photographic emulsions.

One of its objects is to provide such an emulsion the sensitiveness of which is raised over the range of wave lengths to which the emulsion is normally sensitive. Further objects will be seen from the detailed specification following hereafter.

Figure 1:
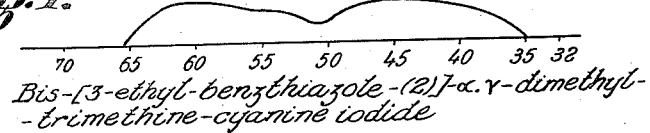
Figure 2:
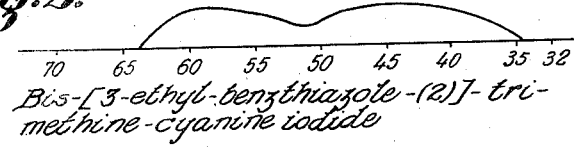

Reference is made to the accompanying drawing in which the curve of Fig. 1 represents the spectogram of a silver halide emulsion sensitized with bis-[3-ethyl-benzthiazole-(2)]-$\alpha.\gamma$-dimethyl-trimethine-cyanine iodide; and of Fig. 2 shows the spectrogram of the same silver halide emulsion sensitized with bis-[3-ethyl-benzthiazole-(2)]-trimethine-cyanine iodide. It is seen that the sensitizing maximum is displaced from about 585 $\mu\mu$ of the dye unsubstituted in the polymethine chain to about 600 $\mu\mu$ of the $\alpha.\gamma$ substituted dye.

The cyanine- or polymethine dyestuffs are built up of two heterocyclic nuclei linked by the so-called polymethine chain of the type:

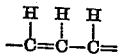

containing a varying number of carbon atoms. Some groups of this class of dyestuffs, particularly the benzthiazole trimethine cyanines, naphthothiazole trimethine cyanines and the pseudo cyanines are known to be optical sensitizers for photographic silver halide emulsions. Each of these dyestuffs has a definite range of absorption and sensitization which can be influenced by introducing substituents into the nuclei. By this means the maximum of sensitization is displaced towards the long-wave region, the result being, however, often unsatisfactory. The behavior of the substituents is not alike in all cases. Moreover, by the introduction of such substituents the solubility of the dyestuff is often considerably decreased and its utilization in practice is rendered rather doubtful.

In the polymethine chain only the central carbon atom could hitherto be substituted when effecting the condensation with, for instance, a trialkylorthoacetic acid ester.

This invention is based on the observation that the hitherto unknown cyanine dyestuffs substituted in the lateral ($\alpha.\gamma$) carbon atoms of the polymethine chain corresponding with the general formula:

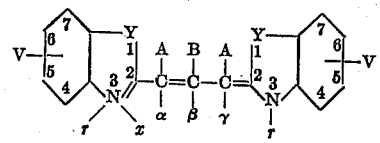

Both Y's=S or both Y's=Se.
V=H, alkoxy, phenylene.
A=alkyl.
B=H, alkyl, aryl.
r=alkyl.
x=an anion capable of precipitating a carbocyamine dye, constitute a large group of very useful sensitizers for silver halide emulsions and have general properties not very different from those of the unsubstituted dyestuffs. The characteristic form of the spectogram and the solubility of the corresponding unsubstituted compounds are not materially altered, whereas their sensitizing maximum is displaced to a small extent towards the long-wave region, in correspondence with the number and kind of substituents introduced in the polymethine chain.

Whereas the hitherto known cyanine dyestuffs are made by condensing 2-methylbenzthiazole with a trialkylorthocarboxylic acid ester, the starting materials for the preparation of bodies substituted in the side links of the polymethine chain are 2-ethylbenzthiazole, 2-propylbenzthiazole, 2-benzylbenzthiazole or the homologues thereof. These bases may be condensed in known manner to form cyanines, for instance, trimethine cyanines or dyestuffs being obtained which in the lateral carbon atoms of the polymethine chain are substituted by alkyl or aryl groups. In the case of the trimethine the dyestuffs may further be substituted at the carbon atom occupying the central position, by carrying out the condensation with a trialkylorthocarboxylic acid ester.

In the sensitizers according to this invention for the sulfur of the thiazole ring may be substituted by oxygen, selenium.

The following examples serve to illustrate our invention.

*Example 1.*—The dye bis-[3-ethyl-benzthiazole-(2)]-α.γ-methyl-trimethine cyanine iodide corresponding with the formula

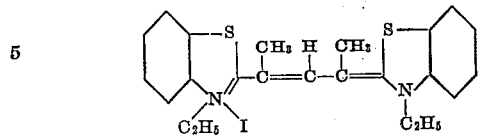

is obtainable by boiling 5 grams of 2 ethylbenzthiazole-ethiodide with 5 cc. of ethyl ortho formate in 10 cc. of pyridine until an intense red violet coloration of the reaction mass is to be seen. On cooling the dye separates in form of short, green needles.

The alcoholic solution of the dye shows an absorption maximum at wave length of about 560 μμ. A silver bromide emulsion containing about 4 percent of silver iodide sensitized with the dye acquires a sensitiveness for wave lengths from about 510 to 660 μμ with a maximum at about 600 μμ.

*Example 2.*—For producing the dye bis-[3-ethyl-naphtho:2'.1':4.5-thiazole-(2)]-α.β.γ-trimethyl-trimethine-cyanine iodide corresponding with the formula

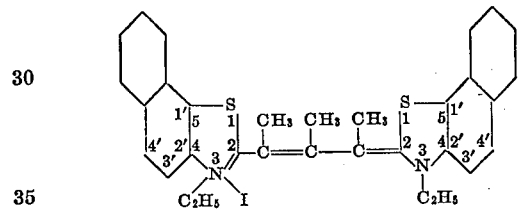

5 grams of 2-ethyl-β-naphthothiazole-diethylsulfate are boiled with 5 cc. of ethyl ortho acetate in 10 cc. of pyridine until an intense blue color is seen, and then the dye is precipitated by the addition of a 5 per cent solution of potassium iodide. The dye crystallizes in form of a bluish black powder.

In its alcoholic solution the dye shows an absorption maximum at about 590 μμ. Incorporated in a silver bromide emulsion containing about 4 per cent of silver iodide the dye imparts to it a range of sensitiveness from about 515 to 700 μμ with a maximum at about 630 μμ.

*Example 3.*—The dye bis-[3-ethyl-naphtho-2'.1':4.5-thiazole-(2)]-α.γ-diethyl-tri-methine-cyanine iodide corresponding with the formula

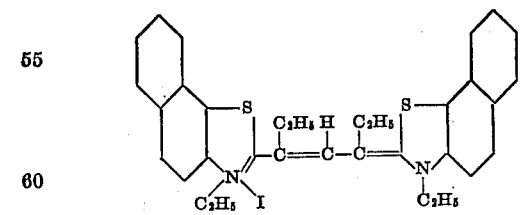

may be produced by boiling 5 grams of 2-propyl-β-naphthol-thiazole-diethylsulfate and 5 cc. of ethyl ortho formate in 10 cc. of pyridine for about ½ hour. On addition of a 5 per cent solution of potassium iodide to the deep blue reaction mixture the dye precipitates in form of short blackish green needles.

The alcoholic solution of the dye shows an absorption maximum at about 592 μμ. A silver bromide emulsion containing about 4 per cent of silver iodide sensitized with the dye acquires a sensitiveness to wave lengths from about 510 to 700 μμ with a maximum at about 625 μμ.

*Example 4.*—The dye bis-[3-methyl-benzselenazole-(2)]-α.β.γ-trimethyl-trimethine-cyanine bromide corresponding with the formula

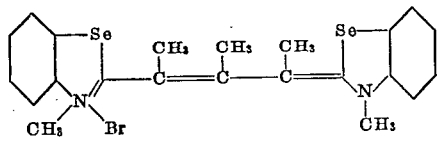

is obtainable by heating 5 grams of 2-ethyl-benzselenazole-dimethylsulfate and 5 cc. of ethyl ortho acetate in 10 cc. of pyridine for about 1 hour to 120° C. On addition of about 20 cc. of a 5 per cent solution of potassium bromide the dye precipitates in form of bluish red flakes. By recrystallization from methanol a bluish green crystalline powder is obtainable.

The alcoholic solution of the dye has an absorption maximum at about 550 μμ. A silver bromide emulsion containing about 4 per cent of silver iodide sensitized with the dye acquires a sensitiveness to waves from about 500 to 690 μμ with a maximum at about 610 μμ.

*Example 5.*—When working according to the method indicated in Example 4 but condensing with ethyl ortho propionate instead of the acetate the dye bis-[3-ethyl-benzselenazole(2)]-α.γ-dimethyl-β-ethyl-trimethine-cyanine bromide corresponding with the formula

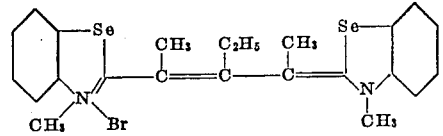

is obtainable in form of a red violet crystalline powder.

The alcoholic solution of this dye has an absorption maximum at about 560 μμ. Incorporated in a silver bromide emulsion containing about 4 per cent of silver iodide the dye imparts to it a range of sensitiveness from about 510 to 690 μμ with a maximum at about 585 μμ which is, however, not very distinct.

*Example 6.*—The dye bis-[3-ethyl-5-ethoxy-benzselenazole-(2)]-α.γ-dimethyl-trimethine-cyanine bromide corresponding with the formula

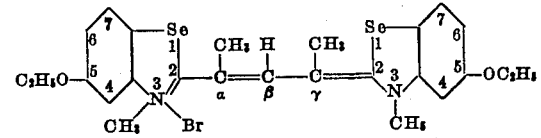

is produced by heating 2 grams of 2-ethyl-5-ethoxy-benzselenazole-diethylsulfate with 2 cc. of ethyl ortho formate and 5 cc. of pyridine for about ½ hour to about 140° C. and precipitating the dye from the deep blue pyridine solution by means of about 10 cc. of a 5 per cent solution of potassium bromide. By recrystallization from methanol bluish green needles are obtained.

The alcoholic solution of the dye has an absorption maximum at about 590 μμ. Incorporated in a silver bromide emulsion containing about 4 per cent of silver iodide the dye imparts to it a range of sensitiveness from about 520 to 700 μμ with a maximum at about 640 μμ.

The bases serving as starting material for the production of the dyes are obtainable analogously to known methods.

It is to be understood that our invention is not limited to the foregoing examples or to the specific details given therein. Numerous other embodiments are possible and we contemplate as included within our invention all such modifications and equivalents as fall within the scope of the appended claims. So, for instance, the benzene nuclei may contain one or more substituents. The nomenclature used is arbitrary, but it is familiar to every chemist skilled in the art and has the advantage of clearness. The formulae of the dyes as given herein represent the molecular structure of our new dyes so far as known. If, however, in the future it should become evident that the formulae do not exactly correspond to the dyes this fact will not affect our invention since the dyes will be easily identified by the method of producing the same which has been fully described in the examples and is analogous to known methods.

What we claim is:

1. A photographic material comprising a silver halide emulsion containing a symmetrical trimethine cyanine substituted symmetrically at the α- and γ-carbon atoms by alkyl.

2. A photographic material comprising a silver halide emulsion containing a trimethine cyanine substituted symmetrically at the α- and γ-carbon atoms by alkyl, and at the β-carbon atom by a radical selected from the group consisting of alkyl and aryl of the benzene series.

3. A photographic material comprising a silver halide emulsion containing a trimethine cyanine dye selected from the group consisting of symmetrical benzthiazole-trimethine-cyanines, symmetrical benzelenazole-trimethine-cyanines, and symmetrical naphthothiazole-trimethine-cyanines, susbtituted at the α- and the γ-carbon atoms by an alkyl group.

4. A photographic material comprising a silver halide emulsion containing a trimethine cyanine dye selected from the group consisting of symmetrical benzthiazole-trimethine-cyanines, symmetrical benzelenazole-trimethine-cyanines, and symmetrical naphthothiazole - trimethine - cyanines substituted at the α- and the γ-carbon atoms by a methyl group.

5. A photographic material comprising a silver halide emulsion containing a trimethine cyanine dye selected from the group consisting of symmetrical benzthiazole-trimethine-cyanines, symmetrical benzselenazole-trimethine-cyanines, and symmetrical naphthothiazole-trimethine-cyanines substituted at the α- and the γ-carbon atoms by an ethyl group.

6. A photographic material comprising a silver halide emulsion containing bis-[3-ethyl-benzthiazole-(2)]-α.γ-dimethyl-trimethine-cyanine iodide corresponding probably to the formula

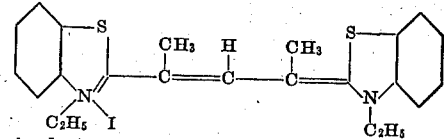

7. A photographic material comprising a silver halide emulsion containing bis-[3-ethyl-naphtho-2′.1′:4.5-thiazole-(2)]-α.γ-diethyl - trimethine-cyanine iodide corresponding to the formula

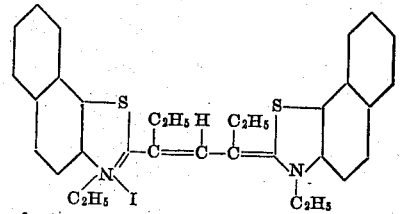

8. A photographic material comprising a silver halide emulsion containing bis-[3-methyl-benzselenazole - (2)]-α.β.γ-trimethine - cyanine bromide corresponding probably to the formula

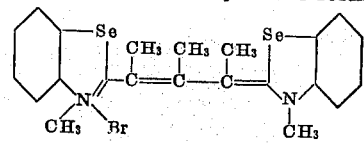

WALTER ZEH.
WILHELM SCHNEIDER.